United States Patent
Lu et al.

(10) Patent No.: US 8,330,885 B2
(45) Date of Patent: Dec. 11, 2012

(54) DISPLAY CIRCUIT ADAPTED FOR A DISPLAY DEVICE AND DISPLAY DEVICE

(75) Inventors: Chao Liang Lu, Hsinchu (TW);
Jing-Tin Kuo, Hsinchu (TW);
Keng-Ming Chen, Hsinchu (TW);
Yu-Cheng Tsai, Hsinchu (TW);
Chi-Mao Hung, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 220 days.

(21) Appl. No.: 12/961,283

(22) Filed: Dec. 6, 2010

(65) Prior Publication Data
US 2011/0187952 A1    Aug. 4, 2011

(30) Foreign Application Priority Data
Feb. 1, 2010    (TW) ................................. 99102785 A (51) Int. Cl.
*G02F 1/136* (2006.01)
(52) U.S. Cl. ....................................................... 349/41
(58) Field of Classification Search ...................... 349/41
See application file for complete search history.

(56) References Cited

U.S. PATENT DOCUMENTS

| | | | |
|---|---|---|---|
| 2008/0067512 A1* | 3/2008 | Lee et al. | 257/59 |
| 2009/0102997 A1* | 4/2009 | Wen et al. | 349/54 |
| 2009/0219469 A1* | 9/2009 | Kim | 349/106 |
| 2009/0290081 A1* | 11/2009 | Cho et al. | 349/42 |
| 2010/0073617 A1* | 3/2010 | Han | 349/143 |
| 2011/0025936 A1* | 2/2011 | Chang et al. | 349/37 |

FOREIGN PATENT DOCUMENTS
CN    101546056 A    9/2009

* cited by examiner

*Primary Examiner* — Timothy L Rude
(74) *Attorney, Agent, or Firm* — Muncy, Geissler, Olds & Lowe, PLLC (57) ABSTRACT

A display circuit adapted for a display device and the display device are provided. The display device comprises a gate drive device, a data drive device and the display circuit. The display circuit comprises at least one display unit which has four pixels. Each of the pixels has two sub-pixels, each of which has a transistor coupled to a pixel electrode. The transistors of the two sub-pixels of each of pixels are cascaded to electrically connect to the data drive device. The transistors of the two sub-pixels of each of pixels are electrically connected to the gate drive device, respectively, to receive signals, provided from the gate drive device, as switching signals for determining whether a data voltage provided by the data drive device is received or not.

14 Claims, 7 Drawing Sheets

DISPLAY CIRCUIT ADAPTED FOR A DISPLAY DEVICE AND DISPLAY DEVICE

This application claims the benefit of Taiwan Patent Application No. 099102785 filed on Feb. 1, 2010, which is hereby incorporated by reference in its entirety.

CROSS-REFERENCES TO RELATED APPLICATIONS

Not applicable.

BACKGROUND OF THE INVENTION

1. Field of the Invention

The present invention relates to a display circuit adapted for a display device and the display device. More particularly, in the display circuit of the present invention, two sub-pixels are cascaded to receive data voltages supplied by a data drive device through a single data line so that the number of data lines needed by the display circuit as a whole can be reduced by a half as compared to that in a conventional display circuit.

2. Descriptions of the Related Art

Owing to advancement of electronic display technologies, various electronic display devices have found wide application in people's daily life and displaying quality thereof also becomes ever higher to meet the consumers' demands. An electronic display device presents an image by controlling a plurality of display units arranged in an array form, in which each pixel comprises a transistor and a pixel electrode. The transistor of each pixel is respectively connected to a different data line to receive a data voltage, and transfers the data voltage to the pixel electrode so that the pixel can emit light.

As the electronic display devices nowadays are made to have increasingly larger sizes, the number of pixels in the display devices must be increased in proportion to the sizes of the display devices in order to maintain the precise and fine displaying quality of the presented image. Correspondingly, a larger number of data lines are needed to supply a data voltage to each of the pixels. As a result, the large-sized electronic display devices have a shortcoming of high power consumption.

In view of this, an urgent need exists in the art to decrease power consumption of the electronic display devices while still maintaining the displaying quality thereof so as to improve the market value of the electronic display devices.

SUMMARY OF THE INVENTION

In view of the problems of the prior art, one objective of the present invention is to provide a display device and a display circuit thereof. The display circuit has two sub-pixels of each pixel cascaded to receive a data voltage, which, in combination with arrangement of the pixels and connection relationships of data lines and gate lines with the pixels, can decrease the number of data lines needed. Thereby, power consumption of the electronic display device is decreased.

To achieve the aforesaid objective, the present invention provides a display device. The display device comprises a display circuit, a gate drive device and a data drive device. The gate drive device is configured to generate a plurality of gate signals. The data drive device is configured to generate a plurality of data signals. The gate signals comprise a first gate signal, a second gate signal and a third gate signal, and the data signals comprise a first data signal, a second data signal and a third data signal.

The display circuit comprises a first gate line, a second gate line, a third gate line, a first data line, a second data line, a third data line and at least one display unit. The first gate line is disposed along a row direction and electrically connected to the gate drive device, and is configured to receive the first gate signal. The second gate line is disposed below and in parallel with the first gate line along the row direction and electrically connected to the gate drive device, and is configured to receive the second gate signal. The third gate line is disposed below and in parallel with the second gate line along the row direction and electrically connected to the gate drive device, and is configured to receive the third gate signal. The first data line is disposed along a column direction perpendicular to the row direction and electrically connected to the data drive device, and is configured to receive the first data signal. The second data line is disposed at the left side of the first data line and in parallel with the first data line along the column direction and electrically connected to the data drive device, and is configured to receive the second data signal, wherein a polarity of the second data signal is opposite to a polarity of the first data signal. The third data line is disposed at the left side of the second data line and in parallel with the second data line along the column direction and electrically connected to the data drive device, and is configured to receive the third data signal, wherein a polarity of the third data signal is opposite to the polarity of the second data signal and identical to the polarity of the first data signal.

Additionally, the display unit comprises a first pixel, a second pixel, a third pixel and a fourth pixel. The first pixel comprises a 1A sub-pixel and a 1B sub-pixel. The 1A sub-pixel comprises a 1A transistor, which comprises a 1A gate, a 1A source and a 1A drain. The 1B sub-pixel comprises a 1B transistor, which comprises a 1B gate, a 1B source and a 1B drain. The 1A sub-pixel is disposed at the left side of the 1B sub-pixel along the row direction. The 1A source is coupled to the first data line, the 1A gate is coupled to the second gate line, the 1A drain is coupled to the 1B source, and the 1B gate is coupled to the first gate line.

The second pixel is disposed at the left side of the first pixel along the row direction, and comprises a 2A sub-pixel and a 2B sub-pixel. The 2A sub-pixel comprises a 2A transistor, which comprises a 2A gate, a 2A source and a 2A drain. The 2B sub-pixel comprises a 2B transistor, which comprises a 2B gate, a 2B source and a 2B drain. The 2A sub-pixel is disposed at the right side of the 2B sub-pixel along the row direction. The 2A source is coupled to the second data line, the 2A gate is coupled to the second gate line, the 2A drain is coupled to the 2B source, and the 2B gate is coupled to the first gate line.

The third pixel is disposed below the first pixel along the column direction, and comprises a 3A sub-pixel and a 3B sub-pixel. The 3A sub-pixel comprises a 3A transistor, which comprises a 3A gate, a 3A source and a 3A drain. The 3B sub-pixel comprises a 3B transistor, which comprises a 3B gate, a 3B source and a 3B drain. The 3A sub-pixel is disposed at the right side of the 3B sub-pixel along the row direction. The 3A source is coupled to the second data line, the 3A gate is coupled to the third gate line, the 3A drain is coupled to the 3B source, and the 3B gate is coupled to the second gate line.

The fourth pixel is disposed at the left side of the third pixel along the row direction and below the second pixel along the column direction, and comprises a 4A sub-pixel and a 4B sub-pixel. The 4A sub-pixel comprises a 4A transistor, which comprises a 4A gate, a 4A source and a 4A drain. The 4B sub-pixel comprises a 4B transistor, which comprises a 4B gate, a 4B source, and a 4B drain. The 4A sub-pixel is disposed at the left side of the 4B sub-pixel along the row direction. The 4A source is coupled to the third data line, the 4A gate is coupled to the third gate line, the 4A drain is coupled to the 4B source, and the 4B gate is coupled to the second gate line.

To achieve the aforesaid objective, the display device may also comprise another kind of display circuit. The display circuit comprises a first gate line, a second gate line, a first data line and a first pixel. The gate lines are arranged adjacent to and in parallel with each other along a row direction. The data line is arranged along a column direction perpendicular to the row direction. The first pixel comprises a 1A sub-pixel and a 1B sub-pixel. The 1A sub-pixel comprises a first switch and a first pixel electrode. The first switch comprises a control end, a first end and a second end, in which the control end of the first switch is coupled to the second gate line, the first end of the first switch is coupled to the first data line, and the second end of the first switch is coupled to the first pixel electrode. The 1B sub-pixel comprises a second switch and a second pixel electrode. The second switch comprises a control end, a first end and a second end, in which the control end of the second switch is coupled to the first gate line, the first end of the second switch is coupled to the first pixel electrode, and the second end of the second switch is coupled to the second pixel electrode. The second pixel electrode is disposed between the first pixel electrode and the first data line.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a display device and a display circuit thereof. In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1:
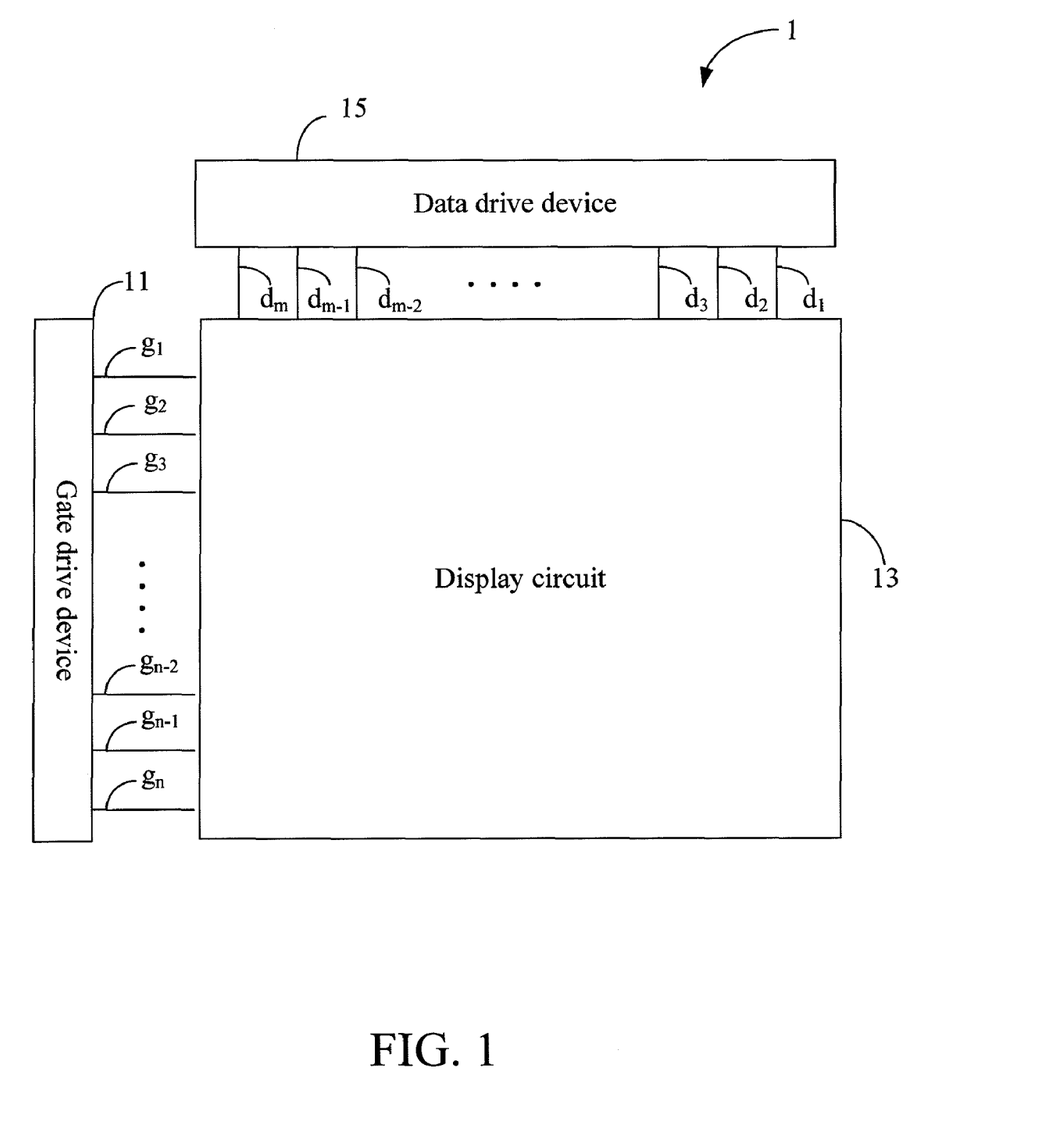
FIG. 1 is a schematic view of a display device according to an embodiment of the present invention.

An embodiment of the present invention is shown in FIG. 1, which is a schematic view of a display device 1 of the present invention. The display device 1 comprises a gate drive device 11, a display circuit 13 and a data drive device 15. The gate drive device 11 is configured to generate a plurality of gate signals and provide the gate signals to the display circuit 13 via a plurality of gate lines (i.e., $g_1, g_2, g_3, \ldots, g_{n-2}, g_{n-1}, g_n$). The data drive device 15 is configured to generate a plurality of data signals and provide the data signals to the display circuit 13 via a plurality of data lines (i.e., $d_1, d_2, d_3, \ldots, d_{m-2}, d_{m-1}, d_m$). As restricted by the paper size and for purpose to describe technical contents of the present invention more clearly, only a part of the display circuit 13 (i.e., a single display unit 135 to be described later), a part of the gate lines (i.e., gate lines $g_1, g_2, g_3$ to be described later) and a part of the data lines (i.e., data lines $d_1, d_2, d_3$ to be described later) are depicted in the following description and the attached drawings, while other parts are omitted from depiction.

Figure 2:
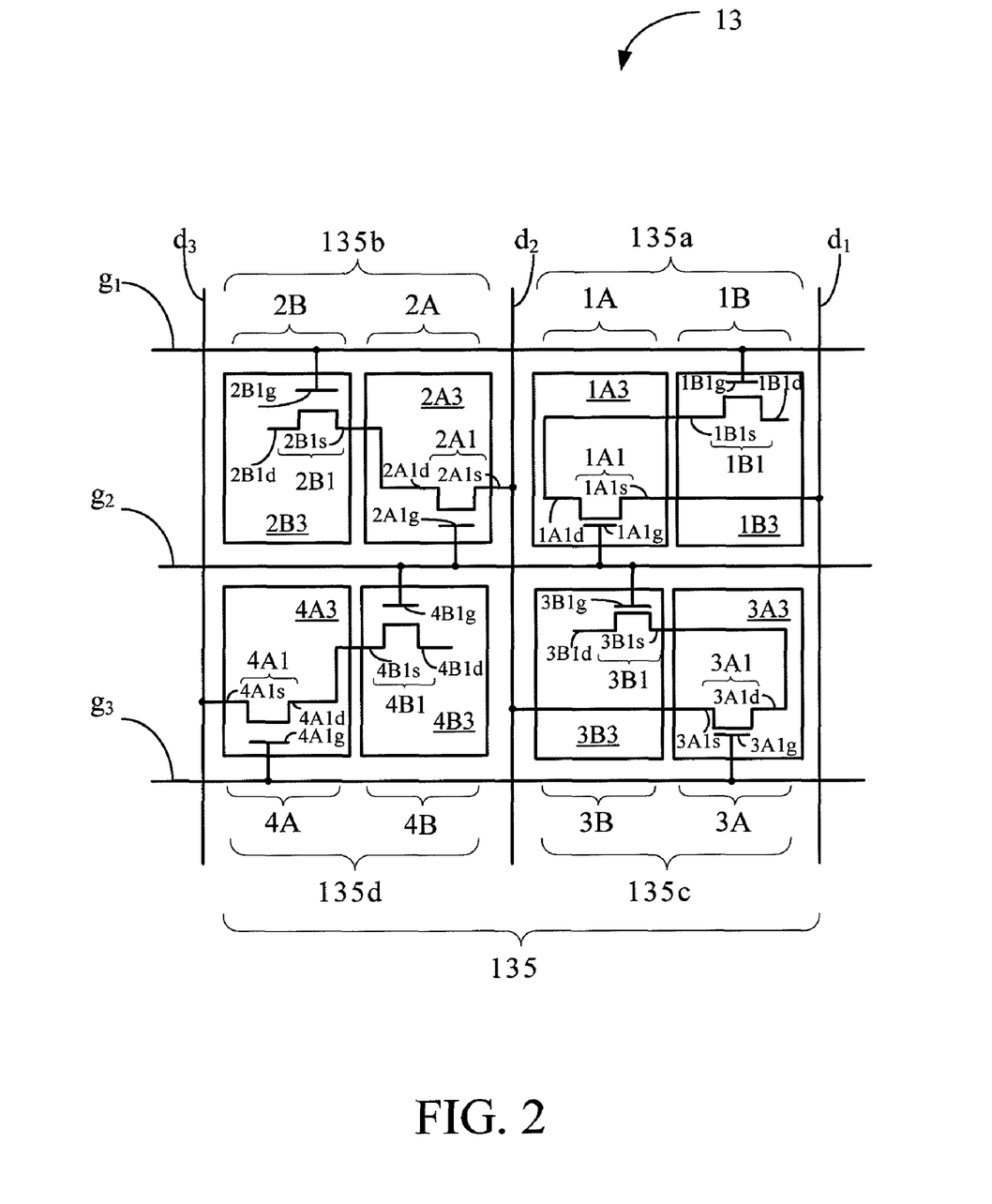
FIG. 2 is a schematic view of a display circuit of the display device according to the embodiment of the present invention.

Referring further to FIG. 2, a part of the display circuit 13 of the display device 1 is shown therein. The display circuit 13 comprises a first gate line $g_1$, a second gate line $g_2$, a third gate line $g_3$, a first data line $d_1$, a second data line $d_2$, a third data line $d_3$, a plurality of display units 135 and a common electrode (not shown). The first gate line $g_1$, the second gate line $g_2$ and the third gate line $g_3$ are configured to carry a first gate signal $Sg_1$, a second gate signal $Sg_1$ and a third gate signal $Sg_3$ respectively, and the first data line $d_1$, the second data line $d_2$ and the third data line $d_3$ are configured to carry a first data signal $Sd_1$, a second data signal $Sd_2$ and a third data signal $Sd_3$ respectively. The common electrode is configured to supply a common voltage to the display units 135. Each of the display units 135 comprises four pixels, i.e., a first pixel 135a, a second pixel 135b, a third pixel 135c and a fourth pixel 135d. As previously described, for ease of understanding and as restricted by the paper size, only a single display unit 135 is depicted in FIG. 2 in this embodiment, and the whole display circuit is simply a repeated extension of the part depicted in FIG. 2. In practical applications, the number of display units may be optionally increased as needed by those skilled in the art.

As shown in FIG. 2, the first gate line $g_1$ is disposed along a row direction, and is electrically connected to the gate drive device 11 to receive a first gate signal $Sg_1$ generated by the gate drive device 11. The second gate line $g_2$ is disposed below and in parallel with the first gate line $g_1$ along also the row direction, and is electrically connected to the gate drive device 11 to receive a second gate signal $Sg_2$ generated by the gate drive device 11. Similarly, the third gate line $g_3$ is disposed below and in parallel with the second gate line $g_2$ along also the row direction, and is electrically connected to the gate drive device 11 to receive a third gate signal $Sg_3$ generated by the gate drive device 11.

Figure 3:
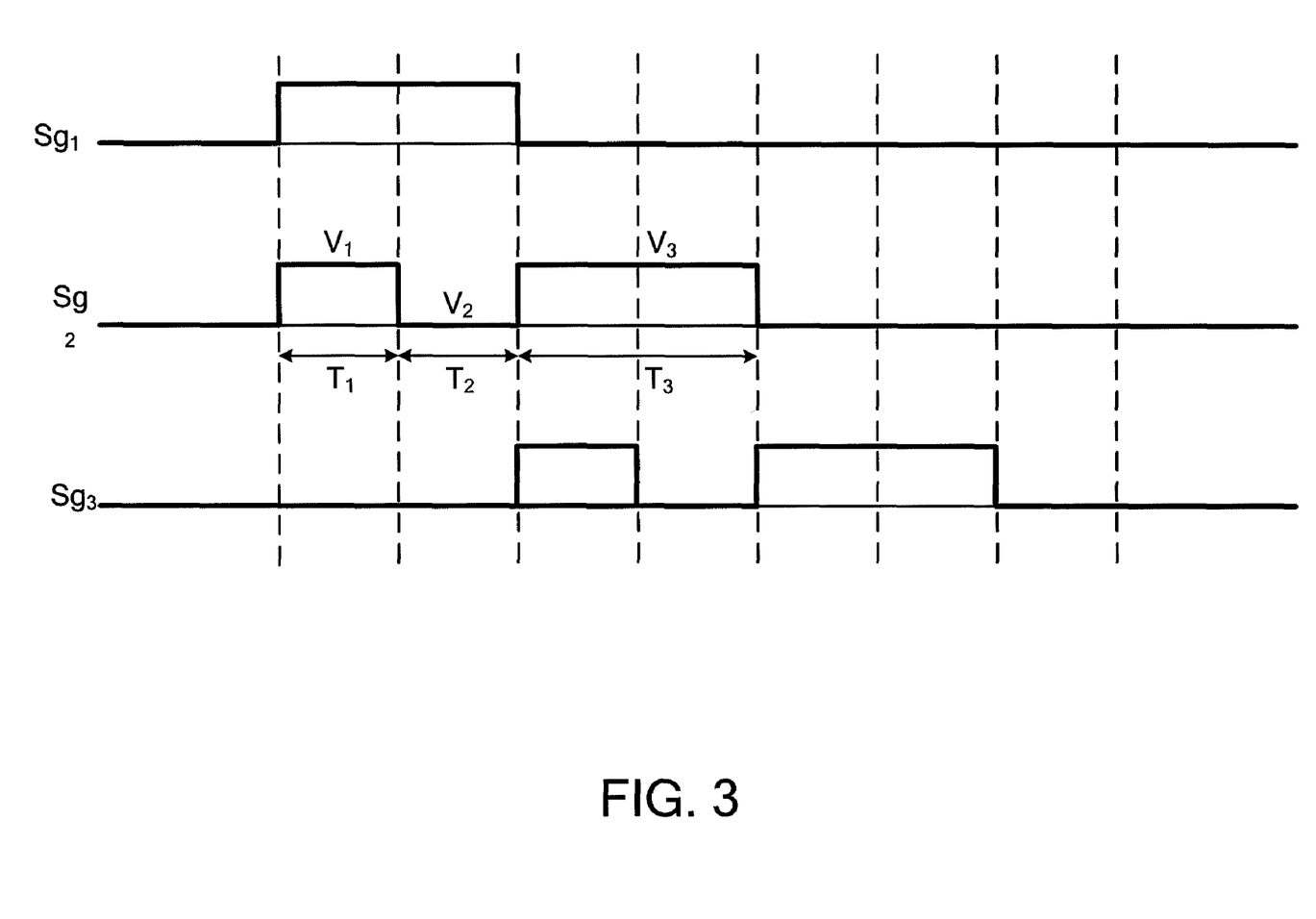
FIG. 3 is a gate voltage waveform applied to a display circuit of the present invention.
Figure 4:
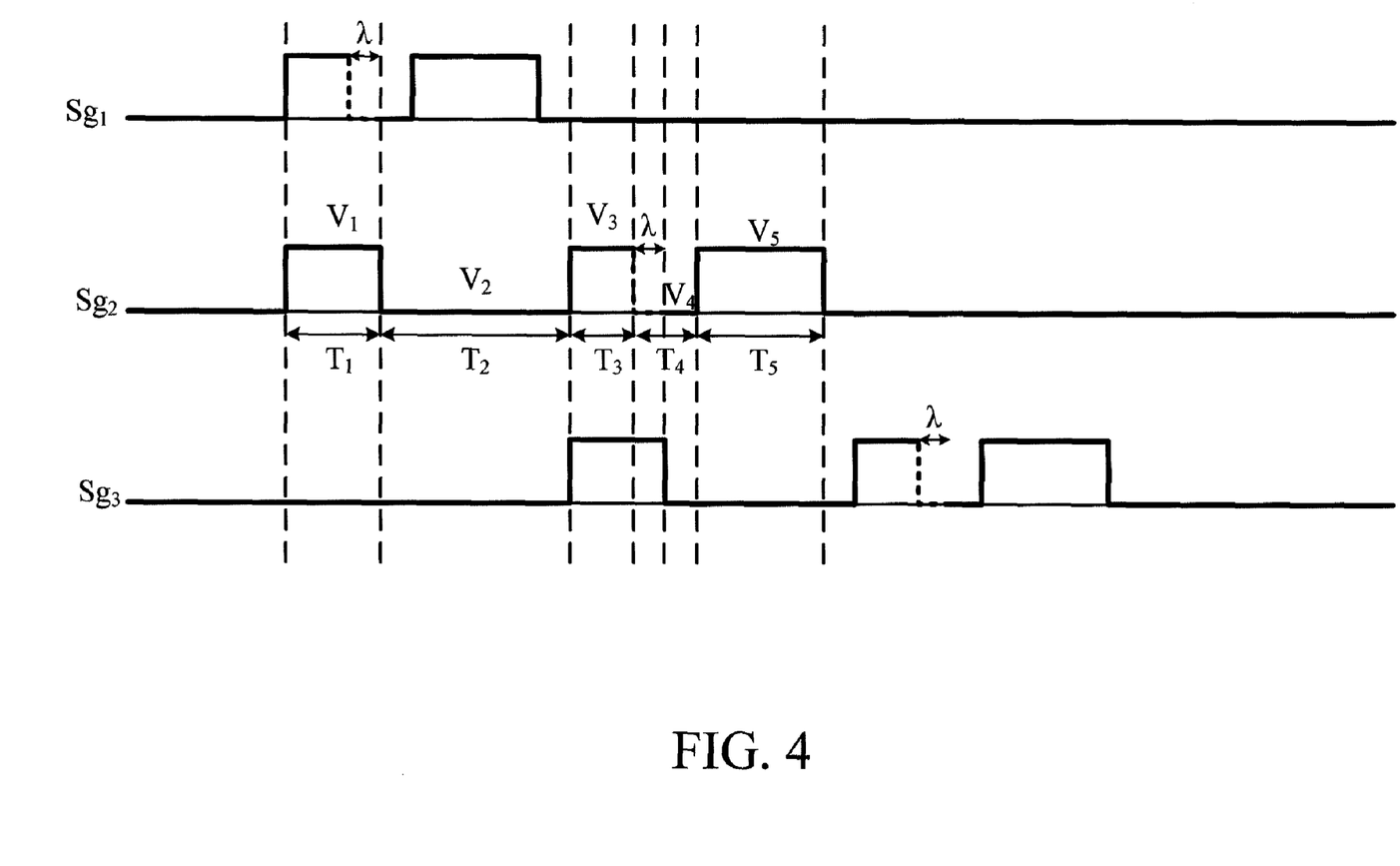
FIG. 4 is another gate voltage waveform applied to the display circuit of the present invention.
Figure 5:
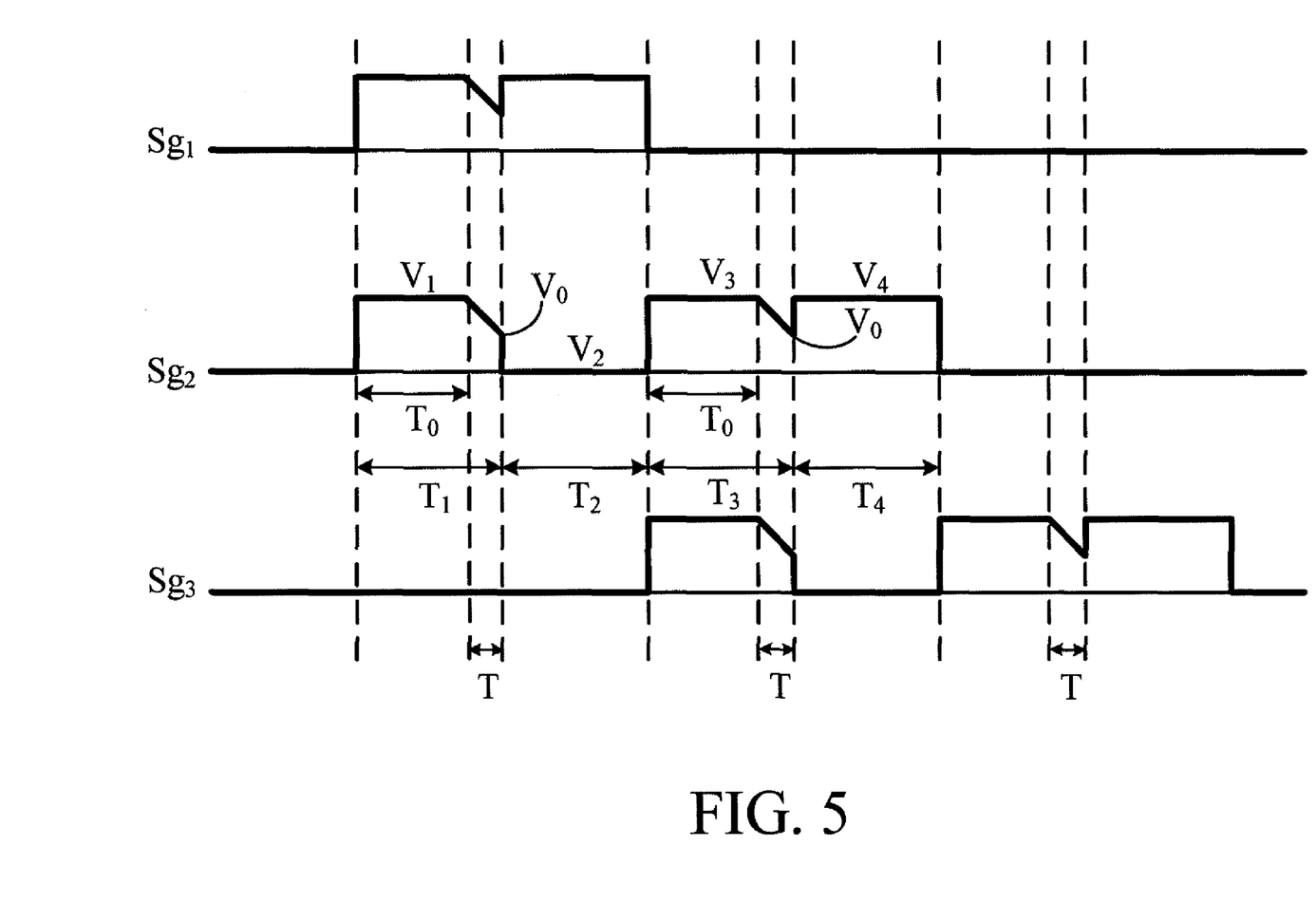
FIG. 5 is a further gate voltage waveform applied to the display circuit of the present invention.
Figure 6:
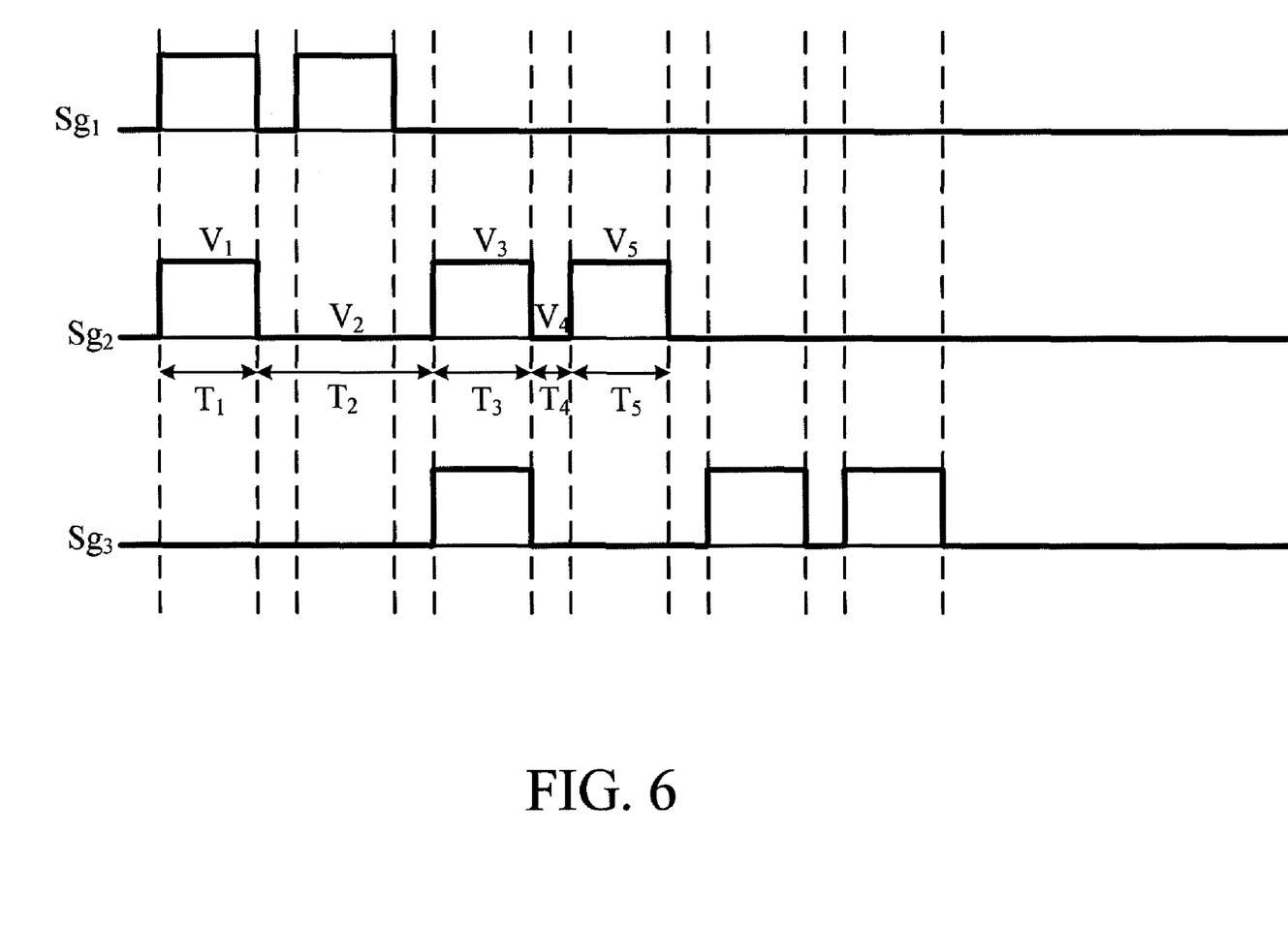
FIG. 6 is yet another gate voltage waveform applied to the display circuit of the present invention.

Each of the first gate signal $Sg_1$, the second gate signal $Sg_2$ and the third gate signal $Sg_3$ has a voltage waveform as shown by one of the waveforms depicted in FIG. 3 to FIG. 6. In FIG. 3, the voltage waveform of each of the gate signals $Sg_1, Sg_2, Sg_3$ comprises three time intervals, i.e., a first interval $T_1$, a second interval $T_2$ and a third interval $T_3$. The voltage waveform has a voltage value $V_1$ in the first interval $T_1$, a voltage value $V_2$ in the second interval $T_2$ and a voltage value $V_3$ in the third interval $T_3$. Additionally, in FIG. 3, $V_1$ and $V_3$ are at a high voltage level, and $V_2$ is at a low voltage level, wherein $V_1 = V_3 > V_2$, $T_1 = T_2$, $T_3 = 2T_1$. Furthermore, as will be readily appreciated by any of those skilled in the art, the first gate signal $Sg_1$, the second gate signal $Sg_2$ and the third gate signal $Sg_3$ have the same waveform except that a fixed difference in time exists therebetween (i.e., $Sg_2(t-\tau) = Sg_1(t)$ and $Sg_3(t-\tau) = Sg_2(t)$, where t is a time variable and $\tau$ is a constant), and relationships between other gate signals are also identical to what described above. Additionally, relationships between the gate signals depicted in FIG. 4 to FIG. 6 are also identical to what described above, and thus will not be further described hereinafter.

In FIG. 4, the voltage waveform of each of the gate signals $Sg_1$, $Sg_2$, $Sg_3$ comprises a first interval $T_1$, a second interval $T_2$, a third interval $T_3$, a fourth interval $T_4$ and a fifth interval $T_5$. The voltage waveform has a voltage value $V_1$ in the first interval $T_1$, a voltage value $V_2$ in the second interval $T_2$, a voltage value $V_3$ in the third interval $T_3$, a voltage value $V_4$ in the fourth interval $T_4$ and a voltage value $V_5$ in the fifth interval $T_5$. Additionally, in FIG. 4, $V_1$, $V_3$ and $V_5$ are at a high voltage level, and $V_2$ and $V_4$ are at a low voltage level, wherein $V_1=V_3=V_5>V_2=V_4$, $T_1>>\lambda$, $T_2=(T_1+2\lambda)$, $T_3=(T_1-\lambda)$, $T_4=2\lambda$, and $\lambda$ is a constant.

In FIG. 5, the voltage waveform of each of the gate signals $Sg_1$, $Sg_2$, $Sg_3$ comprises a first interval $T_1$, a second interval $T_2$ and a third interval $T_3$. The first interval $T_1$ may be further divided into an interval $T_0$ and an interval $(T_1-T_0)$. The voltage waveform has a voltage value $V_1$ in the interval $T_0$, a voltage value that decrements from $V_1$ to $V_0$ as a function of the time in the interval $(T_1-T_0)$, and a voltage value $V_2$ in the second interval $T_2$. The third interval $T_3$ may be further divided into an interval $T_0$ and an interval $(T_3-T_0)$. The voltage waveform has a voltage value $V_3$ in the interval $T_0$, a voltage value that decrements from $V_1$ to $V_0$ as a function of the time in the interval $(T_3-T_0)$, and a voltage value $V_4$ in the fourth interval $T_4$. Additionally, in FIG. 5, $V_1$, $V_3$ and $V_4$ are at a high voltage level, $V_2$ is at a low voltage level and $V_0$ is at a voltage level ranging between the high voltage level and the low voltage level, wherein $V_1=V_3=V_4>V_2$, $V_1>V_0 \geq V_2$, $T_1=T_2=T_3=T_4$, $T=T_1-T_0$.

In FIG. 6, the voltage waveform of each of the gate signals $Sg_1$, $Sg_2$, $Sg_3$ comprises a first interval $T_1$, a second interval $T_2$, a third interval $T_3$, a fourth interval $T_4$ and a fifth interval $T_5$. The voltage waveform has a voltage value $V_1$ in the first interval $T_1$, a voltage value $V_2$ in the second interval $T_2$, a voltage value $V_3$ in the third interval $T_3$, a voltage value $V_4$ in the fourth interval $T_4$ and a voltage value $V_5$ in the fifth interval $T_5$. Additionally, in FIG. 6, $V_1$, $V_3$ and $V_5$ are at a high voltage level, and $V_2$ and $V_4$ are at a low voltage level, wherein $V_1=V_3=V_5>V_2=V_4$, $T_1=T_3=T_5$, $T_2=2T_1$, $T_4<T_1$.

The first data line $d_1$ is disposed along a column direction perpendicular to the row direction and is electrically connected to the data drive device 15 to receive a first data signal $Sd_1$ generated by the data drive device 15. The second data line $d_2$ is disposed at the left side of and in parallel with the first data line $d_1$ along the column direction, and is electrically connected to the data drive device 15 to receive a second data signal $Sd_2$ generated by the data drive device 15. The third data line $d_3$ is disposed at the left side of and in parallel with the second data line $d_2$ along the column direction, and is electrically connected to the data drive device 15 to receive a third data signal $Sd_3$ generated by the data drive device 15. In the present invention, to have polarities of the first pixel 135a, the second pixel 135b, the third pixel 135c and the fourth pixel 135d behave in a dot inversion, the polarity of the second data signal $Sd_2$ is designed to be opposite to that of the first data signal $Sd_1$, and the polarity of the third data signal $Sd_3$ is designed to be opposite to that of the second data signal $Sd_2$ and identical to that of the first data signal $Sd_1$. Thus, by designing the polarities of the pixels to behave in the dot inversion, the problem of power consumption can be further improved.

In the present invention, each of the pixels comprises two sub-pixels, which are cascaded to receive data signals from a data drive device 15 via a data line. Therefore, as compared to a prior art display circuit having the same number of pixels, the number of data lines of the display circuit 1 of the present invention can be reduced by a half, thus achieving a power-saving effect. Detailed circuit structures of the individual pixels, i.e., the connection relationships between the sub-pixels and the connection relationships between the sub-pixels and the data lines as well as the gate lines, will be described in detail hereinafter.

The first pixel 135a comprises a sub-pixel 1A and a sub-pixel 1B. The sub-pixel 1A comprises a transistor 1A1 and a pixel electrode 1A3. The transistor 1A1 comprises a gate 1Ag, a source 1As and a drain 1Ad. The sub-pixel 1B comprises a transistor 1B1, which comprises a gate 1B1g, a source 1Bs and a drain 1B1d. The sub-pixel 1A is disposed at the left side of the sub-pixel 1B along the row direction. The source 1A1s of the transistor 1A1 is coupled to the first data line $d_1$ to receive the first data signal $Sd_1$, and the gate 1A1g is coupled to the second gate line $g_2$ to receive the second gate signal $Sg_1$ for switching the transistor 1A1. The drain 1A1d of the transistor 1A1 of the sub-pixel 1A is coupled with the source 1Bs of the transistor 1B1 of the sub-pixel 1B so that the sub-pixel 1A and the sub-pixel 1B are cascaded to receive the first data signal $Sd_1$ carried by the first data line $d_1$ together. The gate 1B1g is coupled to the first gate line $g_1$ to receive the first gate signal $Sg_1$ for switching the transistor 1B1.

Furthermore, the pixel electrode 1A3 is coupled to the drain 1A1d of the transistor 1A1, and the source 1B1s of the transistor 1B1 is coupled to the drain 1A1d of the transistor 1A1 via the pixel electrode 1A3. The sub-pixel 1B comprises a pixel electrode 1B3, and the drain 1B1d of the transistor 1B1 is coupled to the pixel electrode 1B3. Furthermore, the sub-pixel 1A comprises a liquid crystal (LC) capacitor (not shown) and a storage capacitor (not shown) which are coupled in parallel between the pixel electrode 1A3 and the common electrode. Similarly, the sub-pixel 1B also comprises an LC capacitor (not shown) and a storage capacitor (not shown) which are coupled in parallel between the pixel electrode 1B3 and the common electrode.

The second pixel 135b comprises a sub-pixel 2A and a sub-pixel 2B. The sub-pixel 2A comprises a transistor 2A1 and a pixel electrode 2A3. The transistor 2A1 comprises a gate 2A1g, a source 2A1s and a drain 2A1d. The sub-pixel 2B comprises a transistor 2B1, which comprises a gate 2B1g, a source 2B1s and a drain 2B1d. The sub-pixel 2A is disposed at the right side of the sub-pixel 2B along the row direction. The source 2A1s of the transistor 2A1 is coupled to the second data line $d_2$ to receive the second data signal $Sd_2$, and the gate 2A1g is coupled to the second gate line $g_2$ to receive the second gate signal $Sg_1$ for switching the transistor 2A1. The drain 2A1d of the transistor 2A1 of the sub-pixel 2A is coupled with the source 2B1s of the transistor 2B1 of the sub-pixel 2B so that the sub-pixel 2A and the sub-pixel 2B are cascaded to receive the second data signal $Sd_2$ carried by the second data line $d_2$ together. The gate 2B1g is coupled to the first gate line $g_1$ to receive the first gate signal $Sg_1$ for switching the transistor 2B1.

Furthermore, the pixel electrode 2A3 is coupled to the drain 2A1d of the transistor 2A1, and the source 2B1s of the transistor 2B1 is coupled to the drain 2A1d of the transistor 2A1 via the pixel electrode 2A3. The sub-pixel 2B comprises a pixel electrode 2B3, and the drain 2B1d of the transistor 2B1 is coupled to the pixel electrode 2B3. The sub-pixel 2A comprises an LC capacitor (not shown) and a storage capacitor (not shown) which are coupled in parallel between the pixel electrode 2A3 and the common electrode. Similarly, the sub-pixel 2B also comprises an LC capacitor (not shown) and a storage capacitor (not shown) which are coupled in parallel between the pixel electrode 2B3 and the common electrode.

The third pixel 135c is disposed at the left side of the fourth pixel 135d along the row direction and below the first pixel 135a along the column direction, and comprises a sub-pixel 3A and a sub-pixel 3B. The sub-pixel 3A comprises a transistor 3A1 and a pixel electrode 3A3. The transistor 3A1 comprises a gate 3A1g, a source 3A1s and a drain 3A1d. The sub-pixel 3B comprises a transistor 3B1, which comprises a gate 3B1g, a source 3B1s and a drain 3B1d. The sub-pixel 3A is disposed at the right side of the sub-pixel 3B along the row direction. The source 3A1s of the transistor 3A1 is coupled to the second data line $d_2$ to receive the second data signal $Sd_2$, and the gate 3A1g is coupled to the third gate line $g_3$ to receive the third gate signal $Sg_3$ for switching the transistor 3A1. The drain 3A1d of the transistor 3A1 of the sub-pixel 3A is coupled with the source 3B1s of the transistor 3B1 of the sub-pixel 3B so that the sub-pixel 3A and the sub-pixel 3B are cascaded to receive the second data signal $Sd_2$ carried by the second data line $d_2$ together. The gate 3B1g is coupled to the second gate line $g_2$ to receive the second gate signal $Sg_1$ for switching the transistor 3B1.

Furthermore, the pixel electrode 3A3 is coupled to the drain 3A1d of the transistor 3A1, and the source 3B1s of the transistor 3B1 is coupled to the drain 3A1d of the transistor 3A1 via the pixel electrode 3A3. The sub-pixel 3B comprises a pixel electrode 3B3, and the drain 3B1d of the transistor 3B1 is coupled to the pixel electrode 3B3. Furthermore, the sub-pixel 3A comprises an LC capacitor (not shown) and a storage capacitor (not shown) which are coupled in parallel between the pixel electrode 3A3 and the common electrode. Similarly, the sub-pixel 3B also comprises an LC capacitor (not shown) and a storage capacitor (not shown) which are coupled in parallel between the pixel electrode 3B3 and the common electrode.

The fourth pixel 135d is disposed below the second pixel 135b along the column direction, and comprises a sub-pixel 4A and a sub-pixel 4B. The sub-pixel 4A comprises a transistor 4A1 and a pixel electrode 4A3. The transistor 4A1 comprises a gate 4A1g, a source 4A1s and a drain 4A1d. The sub-pixel 4B comprises a transistor 4B1, which comprises a gate 4B1g, a source 4B1s and a drain 4B1d. The sub-pixel 4A is disposed at the left side of the sub-pixel 4B along the row direction. The source 4A1s of the transistor 4A1 is coupled to the third data line $d_3$ to receive the third data signal $Sd_3$, and the gate 4A1g is coupled to the third gate line $g_3$ to receive the third gate signal $Sg_3$ for switching the transistor 4A1. The drain 4A1d of the transistor 4A1 is coupled with the source 4B1s of the transistor 4B1 so that the sub-pixel 4A and the sub-pixel 4B are cascaded to receive the third data signal $Sd_3$ carried by the third data line $d_3$ together. The gate 4B1g is coupled to the second gate line $g_2$ to receive the second gate signal $Sg_1$ for switching the transistor 4B1.

Furthermore, the pixel electrode 4A3 is coupled to the drain 4A1d of the transistor 4A1, and the source 4B1s of the transistor 4B1 is coupled to the drain 4A1d of the transistor 4A1 via the pixel electrode 4A3. The sub-pixel 4B comprises a pixel electrode 4B3, and the drain 4B1d of the transistor 4B1 is coupled to the pixel electrode 4B3. Furthermore, the sub-pixel 4A comprises an LC capacitor (not shown) and a storage capacitor (not shown) which are coupled in parallel between the pixel electrode 4A3 and the common electrode. Similarly, the sub-pixel 4B also comprises an LC capacitor (not shown) and a storage capacitor (not shown) which are coupled in parallel between the pixel electrode 4B3 and the common electrode.

It shall be noted that, in this embodiment, the transistor of each of the sub-pixels is a field-effect thin-film transistor (TFT), but it is not merely limited thereto. In other examples, the transistor may also be replaced by other circuits or electronic components with switching functionality. Such circuits or electronic components with switching functionality may also comprise, as described in the aforesaid embodiment, a control end corresponding to a gate, a first end corresponding to a source and a second end corresponding to a drain so as to achieve the aforesaid coupling relationships.

Additionally, as previously described, by virtue of the polarity design of the data signals, the polarities can behave in a dot inversion among the pixels. Accordingly, when the polarities behave in the dot inversion among the pixels, the polarities behave in a column inversion among the sub-pixels.

Figure 7A:
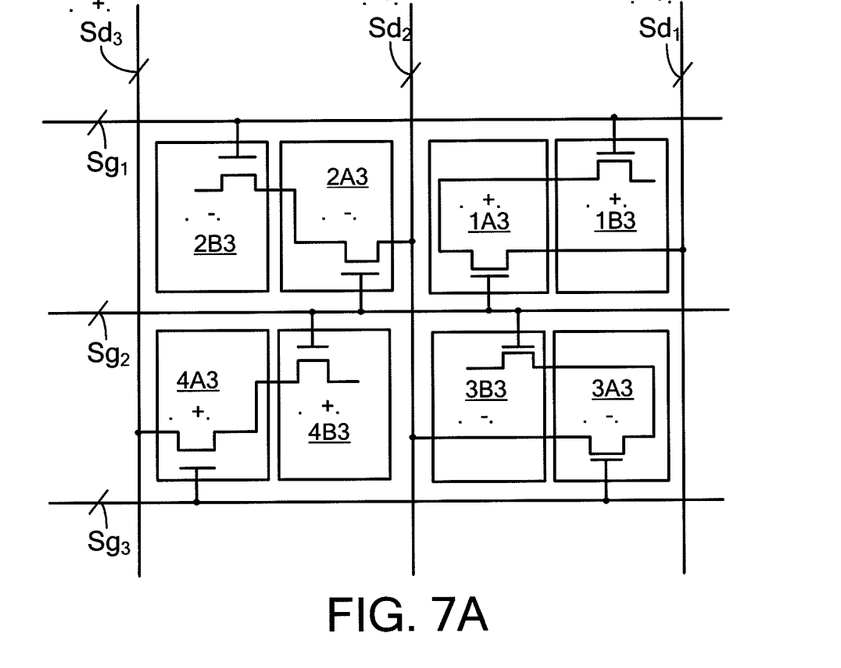
FIG. 7A depicts polarities of pixel electrodes of sub-pixels of the present invention.

In more detail, when the first data signal $Sd_1$ and the third data signals $Sd_3$ both have a positive (+) polarity and the second data signal $Sd_2$ has a negative (−) polarity, relationships of the polarities of the pixel electrodes 1A3, 1B3, 2A2, 2B3, 3A3, 3B3, 4A3 and 4B3 are as shown in FIG. 7A. That is, the pixel electrodes 1A3 and 1B3 of the sub-pixels connected to the first data signal $Sd_1$ are of the positive (+) polarity, the pixel electrodes 1A3, 1B3, 3A3 and 3B3 of the sub-pixels connected to the second data signal $Sd_2$ are of the negative (−) polarity, and the pixel electrodes 4A3 and 4B3 of the sub-pixels connected to the third data signal $Sd_3$ are of the positive (+) polarity. Therefore, the polarities behave in the dot inversion between the pixels, and the polarities behave in the column inversion between the sub-pixels.

Figure 7B:
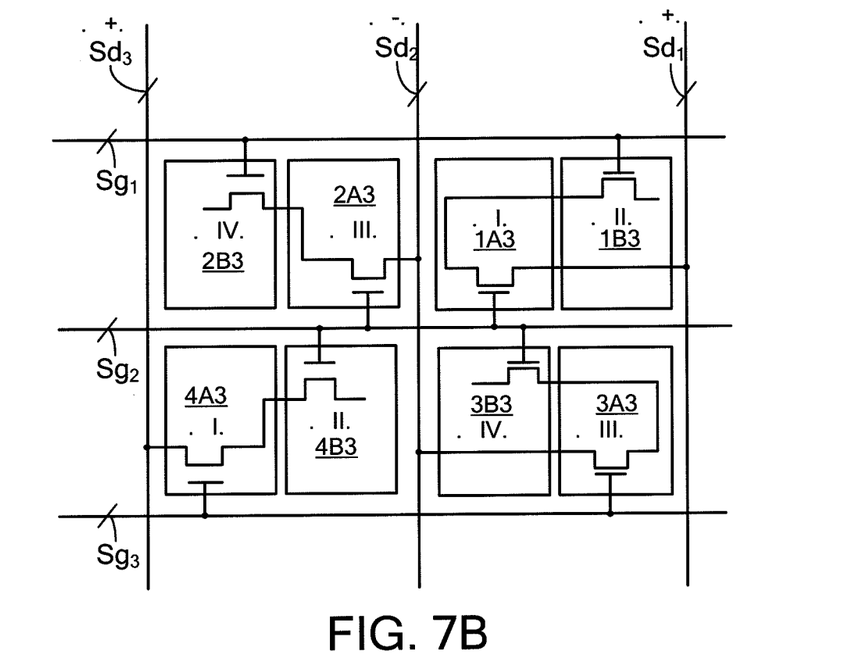
FIG. 7B depicts luminance levels of the pixel electrodes of sub-pixels of the present invention.

Additionally, two adjacent sub-pixels are cascaded to connect to a data line, so when the gate signals as depicted in FIG. 3 to FIG. 6 are received, differences in luminance will exist between the pixels due to differences in timing of the gate lines, and will also exist between adjacent sub-pixels due to differences in their charging durations. Consequently, the pixel electrodes of the present invention present four different luminance levels (I, II, III and IV), as shown in FIG. 7B. However, by means of the design of the bridging circuit and arrangement of the pixels of the present invention, the pixel electrodes presenting the four different luminance levels can be effectively distributed in the whole display circuit, thereby making a displayed image more uniform, even though sub-pixels in two adjacent rows or in two adjacent columns present different luminance levels.

As described in this embodiment, although the way in which the sub-pixels of the first pixel 135a are electrically connected is similar to the way in which the sub-pixels of the second pixel 135b are electrically connected, the first pixel 135a changes the sequence in which the sub-pixels are connected by coupling the source 1A1Bs of the transistor 1A1 of the sub-pixel 1A to the first data line $d_1$ through a line bridging over the sub-pixel 1B. Thus, by means of the design of the bridging circuit and the arrangement of the pixels described above, an identical charging effect of pixel electrodes can be achieved to mitigate abnormal perceptions of flickering in the image as viewed by human eyes.

According to the above description, in the display circuit of the display device of the present invention, transistors of two sub-pixels are cascaded to receive a data voltage so that the number of data lines needed by the whole display device is reduced to a half of that of a conventional display device. Furthermore, by means of the design of the bridging circuit, the arrangement of the pixels and connection relationships between the data lines as well as the gate lines and the pixels of the display circuit, an identical charging effect of pixel electrodes can be achieved effectively to avoid flickering of the displayed image. Therefore, the display device of the present invention can not only maintain the displaying quality thereof but also effectively reduce power consumption of the display circuit, thereby overcoming the shortcomings of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display circuit adapted for a display device, the display device comprising the display circuit, a gate drive device and a data drive device, the gate drive device being configured to generate a plurality of gate signals, the data drive device being configured to generate a plurality of data signals, the gate signals comprising a first gate signal, a second gate signal and a third gate signal, the data signals comprising a first data signal, a second data signal and a third data signal, the display circuit comprising:

a first gate line, disposed along a row direction and electrically connected to the gate drive device, being configured to receive the first gate signal;

a second gate line, disposed below the first gate line and in parallel with the first gate line along the row direction and electrically connected to the gate drive device, being configured to receive the second gate signal;

a third gate line, disposed below the second gate line and in parallel with the second gate line along the row direction and electrically connected to the gate drive device, being configured to receive the third gate signal;

a first data line, disposed along a column direction perpendicular to the row direction and electrically connected to the data drive device, being configured to receive the first data signal;

a second data line, disposed at a left of the first data line and in parallel with the first data line along the column direction and electrically connected to the data drive device, being configured to receive the second data signal, wherein the polarity of the second data signal is opposite to the polarity of the first data signal;

a third data line, disposed at a left side of the second data line and in parallel with the second data line along the column direction and electrically connected to the data drive device, being configured to receive the third data signal, wherein the polarity of the third data signal is opposite to the polarity of the second data signal and identical to the polarity of the first data signal; and at least one display unit, comprising:

a first pixel comprising a 1A sub-pixel and a 1B sub-pixel, wherein the 1A sub-pixel comprises a 1A transistor, the 1A transistor comprises a 1A gate, a 1A source and a 1A drain, the 1B sub-pixel comprises a 1B transistor, the 1B transistor comprises a 1B gate, a 1B source and a 1B drain, the 1A sub-pixel is disposed at a left side of the 1B sub-pixel along the row direction, the 1A source is coupled to the first data line, the 1A gate is coupled to the second gate line, the 1A drain is coupled to the 1B source, the 1B gate is coupled to the first gate line;

a second pixel, disposed at a left side of the first pixel along the row direction, comprising a 2A sub-pixel and a 2B sub-pixel, wherein the 2A sub-pixel comprises a 2A transistor, the 2A transistor comprises a 2A gate, a 2A source and a 2A drain, the 2B sub-pixel comprises a 2B transistor, the 2B transistor comprises a 2B gate, a 2B source and a 2B drain, the 2A sub-pixel is disposed at a right side of the 2B sub-pixel along the row direction, the 2A source is coupled to the second data line, the 2A gate is coupled to the second gate line, the 2A drain is coupled to the 2B source, the 2B gate is coupled to the first gate line;

a third pixel, disposed below the first pixel along the column direction, comprising a 3A sub-pixel and a 3B sub-pixel, wherein the 3A sub-pixel comprises a 3A transistor, the 3A transistor comprises a 3A gate, a 3A source and a 3A drain, the 3B sub-pixel comprises a 3B transistor, the 3B transistor comprises a 3B gate, a 3B source and a 3B drain, the 3A sub-pixel is disposed at a right side of the 3B sub-pixel along the row direction the 3A source is coupled to the second data line, the 3A gate is coupled to the third gate line, the 3A drain is coupled to the 3B source, the 3B gate is coupled to the second gate line; and a fourth pixel, disposed at a left side of the third pixel along the row direction and below the second pixel along the column direction, comprising a 4A sub-pixel and a 4B sub-pixel, wherein the 4A sub-pixel comprises a 4A transistor, the 4A transistor comprises a 4A gate, a 4A source and a 4A drain, the 4B sub-pixel comprises a 4B transistor, the 4B transistor comprises a 4B gate, a 4B source, and a 4B drain, the 4A sub-pixel is disposed at a left side of the 4B sub-pixel along the row direction, the 4A source is coupled to the third data line, the 4A gate is coupled to the third gate line, the 4A drain is coupled to the 4B source, the 4B gate is coupled to the second gate line.

2. The display circuit as claimed in claim 1, wherein the 1A sub-pixel comprises a 1A pixel electrode, the 1B sub-pixel comprises a 1B pixel electrode, the 2A sub-pixel comprises a 2A pixel electrode, the 2B sub-pixel comprises a 2B pixel electrode, the 3A sub-pixel comprises a 3A pixel electrode, the 3B sub-pixel comprises a 3B pixel electrode and a 3B transistor, the 4A sub-pixel comprises a 4A pixel electrode, the 4B sub-pixel comprises a 4B pixel electrode, the 1A drain is coupled to the 1B source through the 1A pixel electrode, the 1B drain is coupled to the 1B pixel electrode, the 2A drain is coupled to the 2B source through the 2A pixel electrode, the 2B drain is coupled to the 2B pixel electrode, the 3A drain is coupled to the 3B source through the 3A pixel electrode, the 3B drain is coupled to the 3B pixel electrode, the 4A drain is coupled to the 4B source through the 4A pixel electrode, the 4B drain is coupled to the 4B pixel electrode.

3. The display circuit as claimed in claim 2, wherein the 1A sub-pixel further comprises a 1A liquid crystal (LC) capacitor coupled between the 1A pixel electrode and the common electrode, the 1B sub-pixel further comprises a 1B LC capacitor coupled between the 1B pixel electrode and the common electrode, the 2A sub-pixel further comprises a 2A LC capacitor coupled between the 2A pixel electrode and the common electrode, the 2B sub-pixel further comprises a 2B LC capacitor coupled between the 2B pixel electrode and the common electrode, the 3A sub-pixel further comprises a 3A LC capacitor coupled between the 3A pixel electrode and the common electrode, and the 3B sub-pixel further comprises a 3B LC capacitor coupled between the 3B pixel electrode and the common electrode, the 4A sub-pixel further comprises a 4A LC coupled between the 4A pixel electrode and the common electrode, the 4B sub-pixel further comprises a 4B LC capacitor coupled between the 4B pixel electrode and the common electrode.

4. The display circuit as claimed in claim 3, wherein the 1A sub-pixel further comprises a 1A storage capacitor coupled between the 1A pixel electrode and the common electrode, the 1B sub-pixel further comprises a 1B storage capacitor coupled between the 1B pixel electrode and the common electrode, the 2A sub-pixel further comprises a 2A storage capacitor coupled between the 2A pixel electrode and the common electrode, the 2B sub-pixel further comprises a 2B storage capacitor coupled between the 2B pixel electrode and the common electrode, the 3A sub-pixel further comprises a 3A storage capacitor coupled between the 3A pixel electrode and the common electrode, and the 3B sub-pixel further comprises a 3B storage capacitor coupled between the 3B pixel electrode and the common electrode, the 4A sub-pixel further comprises a 4A storage capacitor coupled between the 4A pixel electrode and the common electrode, the 4B sub-pixel further comprises a 4B storage capacitor coupled between the 4B pixel electrode and the common electrode.

5. The display unit as claimed in claim 1, wherein the first pixel, the second pixel, the third pixel and the fourth pixel operate in a dot inversion according to the polarities of the first data signal and the second data signal being opposite to the polarity of the third data signal.

6. A display device, comprising:
   a gate drive device, being configured to generate a plurality of gate signals;
   a data drive device, being configured to generate a plurality of data signals; and
   a display circuit as claimed in claim 1;
   wherein the gate signals comprise the first gate signal, the second gate signal and the third gate signal, and the data signals comprise the first data signal, the second data signal and the third data signal.

7. The display device as claimed in claim 6, wherein the first pixel, the second pixel, the third pixel and the fourth pixel operate in a dot inversion according to polarities of the first data signal and the second data signal being opposite to a polarity of the third data signal.

8. The display device as claimed in claim 6, wherein the 1A sub-pixel comprises a 1A pixel electrode, the 1B sub-pixel comprises a 1B pixel electrode, the 2A sub-pixel comprises a 2A pixel electrode, the 2B sub-pixel comprises a 2B pixel electrode, the 3A sub-pixel comprises a 3A pixel electrode, the 3B sub-pixel comprises a 3B pixel electrode, the 4A sub-pixel comprises a 4A pixel electrode, the 4B sub-pixel comprises a 4B pixel electrode, the 1A drain is coupled to the 1B source through the 1A pixel electrode, the 1B drain coupled to the 1B pixel electrode, the 2A drain is coupled to the 2B source through the 2A pixel electrode, the 2B drain is coupled to the 2B pixel electrode, the 3A drain is coupled to the 3B source through the 3A pixel electrode, the 3B drain is coupled to the 3B pixel electrode, the 4A drain is coupled to the 4B source through the 4A pixel electrode, the 4B drain is coupled to the 4B pixel electrode.

9. The display device as claimed in claim 8, wherein the 1A sub-pixel further comprises a 1A LC capacitor coupled between the 1A pixel electrode and the common electrode, the 1B sub-pixel further comprises a 1B LC capacitor between the 1B pixel electrode and the common electrode, the 2A sub-pixel further comprises a 2A LC capacitor coupled between the 2A pixel electrode and the common electrode, the 2B sub-pixel further comprises a 2B LC capacitor coupled between the 2B pixel electrode and the common electrode, the 3A sub-pixel further comprises a 3A liquid capacitor coupled between the 3A pixel electrode and the common electrode, and the 3B sub-pixel further comprises a 3B LC capacitor coupled between the 3B electrode and the common electrode, the 4A sub-pixel further comprises a 4A LC capacitor coupled between the 4A pixel electrode and the common electrode, the 4B sub-pixel further comprises a 4B LC capacitor coupled between the 4B pixel electrode and the common electrode.

10. The display device as claimed in claim 9, wherein the 1A sub-pixel further comprises a 1A storage capacitor coupled between the 1A pixel electrode and the common electrode, the 1B sub-pixel further comprises a 1B storage capacitor coupled between the 1B pixel electrode and the common electrode, the 2A sub-pixel further comprises a 2A storage capacitor coupled between the 2A pixel electrode and the common electrode, the 2B sub-pixel further comprises a 2B storage capacitor coupled between the 2B pixel-electrode and the common electrode, the 3A sub-pixel further comprises a 3A storage coupled between the 3A pixel electrode and the common electrode, and the 3B sub-pixel further comprises a 3B storage coupled between the 3B pixel electrode and the common electrode, the 4A sub-pixel further comprises a 4A storage capacitor coupled between the 4A pixel electrode and the common electrode, the 4B sub pixel further comprises a 4B storage capacitor coupled between the 4B pixel electrode and the common electrode.

11. A display circuit for a display device, comprising:
    a first gate line and a second gate line, being adjacently arranged in parallel along a row direction;
    a first data line, being arranged along a column direction perpendicular to the row direction; and
    a first pixel, comprising:
       a 1A sub-pixel comprising a first switch and a first pixel electrode, wherein the first switch comprises a control end, a first end and a second end, the control end of the first switch is coupled to the second gate line, the first end of the first switch is coupled to the first data line, and the second end of the first switch is coupled to the first pixel electrode;
       a 1B sub-pixel comprising a second switch and a second pixel electrode, wherein the second switch comprises a control end, a first end and a second end, the control end of the second switch is coupled to the first gate line, the first end of the second switch is coupled to the first pixel electrode, the second end of the second switch is coupled to the second pixel electrode, and the second pixel electrode is disposed between the first pixel electrode and the first data line.

12. The display circuit as claimed in claim 11, further comprising a second data line and a second pixel, wherein the second data line is adjacent to the first data line, and the second pixel comprises:
    a 2A sub-pixel comprising a first switch and a first pixel electrode, wherein the first switch comprises a control end, a first end and a second end, the control end of the first switch of the 2A sub-pixel is coupled to the second gate line, the first end of the first switch of the 2A sub-pixel is coupled to the second data line, and the second end of the first switch of the 2A sub-pixel is coupled to the first pixel electrode of the 2A sub-pixel; and
    a 2B sub-pixel comprising a second switch and a second pixel-electrode, wherein the second switch comprises a control end, a first end and a second end, the control end of the second switch of the 2B sub-pixel is coupled to the first gate line, the first end of the second switch of the 2B sub-pixel is coupled to the first pixel electrode of the 2A sub-pixel, the second end of the second switch of the 2B sub-pixel is coupled to the second pixel electrode of the 2B sub-pixel, and the first pixel electrode of the 2A sub-pixel is disposed between the second pixel electrode of the 2B sub-pixel and the second data line.

13. The display circuit as claimed in claim 12, further comprising a third gate line and a third pixel, wherein the second gate line is disposed between the first gate line and the third gate line, the second data line is adjacent to the first data line, and the third pixel comprises:
- a 3A sub-pixel comprising a first switch and a first pixel electrode, wherein the first switch comprises a control end, a first end and a second end, the control end of the first switch of the 3A sub-pixel is coupled to the third gate line, the first end of the first switch of the 3A sub-pixel is coupled to the second data line, and the second end of the first switch of the 3A sub-pixel is coupled to the first pixel electrode of the 3A sub-pixel; and
- a 3B sub-pixel comprising a second switch and a second pixel electrode, wherein the second switch comprises a control end, a first end and a second end, the control end of the second switch of the 3B sub-pixel is coupled to the second gate line, the first end of the second switch of the 3B sub-pixel is coupled to the first pixel electrode of the 3A sub-pixel, the second end of the second switch of the 3B sub-pixel is coupled to the second pixel electrode of the 3B sub-pixel, and the second pixel electrode is disposed between the first pixel electrode of the 3A sub-pixel and the second data line.

14. The display circuit as claimed in claim 11, further comprising a second data line, a third gate line and a third pixel, wherein the second gate line is disposed between the first gate line and the third gate line, the second data line is adjacent to the first data line, and the third pixel comprises:
- a 3A sub-pixel comprising a first switch and a first pixel electrode, wherein the first switch comprises a control end, a first end and a second end, the control end of the first switch of the 3A sub-pixel is coupled to the third gate line, the first end of the first switch of the 3A sub-pixel is coupled to the second data line, and the second end of the first switch of the 3A sub-pixel is coupled to the first pixel electrode of the 3A sub-pixel; and
- a 3B sub-pixel comprising a second switch and a second pixel electrode, wherein the second switch comprises a control end, a first end and a second end, the control end of the second switch of the 3B sub-pixel is coupled to the second gate line, the first end of the second switch of the 3B sub-pixel is coupled to the second pixel electrode of the 3B sub-pixel, the second end of the second switch of the 3B sub-pixel is coupled to the second pixel electrode of the 3B sub-pixel, and the second pixel electrode of the 3B sub-pixel is disposed between the first pixel electrode of the 3B sub-pixel and the second data line.

\* \* \* \* \*